United States Patent
Coria et al.

(10) Patent No.: US 10,358,020 B2
(45) Date of Patent: Jul. 23, 2019

(54) SUNROOF SEAL ASSEMBLY AND METHOD FOR A VEHICLE

(71) Applicant: Honda Motor Co., Ltd., Tokyo (JP)

(72) Inventors: Ricky B. Coria, Dublin, OH (US); Brent N. Gaertner, Cable, OH (US); Jesse W. Schlabach, Marysville, OH (US); Brock J. Stull, Columbus, OH (US); Michael T. Binfet, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/706,808

(22) Filed: Sep. 18, 2017

(65) Prior Publication Data

US 2019/0084394 A1   Mar. 21, 2019

(51) Int. Cl.
*B60J 10/90* (2016.01)
*B60J 10/82* (2016.01)
*B60R 13/06* (2006.01)

(52) U.S. Cl.
CPC .............. *B60J 10/82* (2016.02); *B60R 13/06* (2013.01)

(58) Field of Classification Search
CPC .................................. B60J 10/82; B60J 10/90
USPC ........................................ 296/216.06–216.08
See application file for complete search history.

(56) References Cited

U.S. PATENT DOCUMENTS

| | | | | |
|---|---|---|---|---|
| 4,487,449 A | * | 12/1984 | Igel | B60J 7/1642 24/489 |
| 4,946,225 A | * | 8/1990 | Jardin | B60J 7/022 248/188.2 |
| 6,874,281 B2 | | 4/2005 | Fujita et al. | |
| 6,932,422 B2 | | 8/2005 | Ota et al. | |
| 8,333,427 B2 | | 12/2012 | Sawada | |
| 8,388,053 B2 | | 3/2013 | Kikuchi et al. | |
| 9,227,496 B2 | | 1/2016 | Sawada | |
| 9,415,670 B2 | | 8/2016 | Masumoto | |
| 9,981,539 B1 | * | 5/2018 | Gill | B60J 10/90 |
| 2014/0054930 A1 | | 2/2014 | Kanai | |
| 2015/0240136 A1 | * | 8/2015 | Elgimiabi | C09J 5/06 403/270 |

FOREIGN PATENT DOCUMENTS

| | | |
|---|---|---|
| CN | 1486871 | 4/2004 |
| CN | 102407756 | 4/2012 |
| CN | 203472491 | 3/2014 |
| CN | 203995607 | 12/2014 |
| EP | 0653332 | 5/1995 |
| FR | 2370206 | 6/1978 |

* cited by examiner

*Primary Examiner* — Dennis H Pedder
(74) *Attorney, Agent, or Firm* — Rankin, Hill & Clark LLP (57) ABSTRACT

A sunroof seal assembly and method for a vehicle includes a sunroof frame disposed on the vehicle that defines a sunroof opening into which an associated sunroof panel is received, a first seal member mounted to the sunroof frame for sealing to an underside of a roof of the vehicle and a second seal member slideably mounted to the first seal member for sealing to the associated sunroof panel when the associated sunroof panel is in a closed position.

16 Claims, 7 Drawing Sheets

SUNROOF SEAL ASSEMBLY AND METHOD FOR A VEHICLE

BACKGROUND

Most standard sunroofs on vehicles have a primary seal attached to the sunroof panel (i.e., the panel that includes the transparent member or sunroof glass). During manufacturing and assembly, these sunroofs can achieve a tolerance of +/−1.0 mm as the only significant variation is the sunroof glass being set and the variation of the roof on the vehicle. Primary seals for sunroofs can alternately be provided on the frame which surrounds and/or defines the sunroof opening. These can be referred to as "seal-on-frame" construction in that the primary seal is mounted to the frame on or attached to the vehicle roof that defines and/or surrounds the sunroof opening. Conventionally, these constructions often result in a less desirable tolerance (e.g., +/−3.0 mm).

BRIEF DESCRIPTION

According to one aspect, a sunroof seal assembly for a vehicle includes a sunroof frame disposed on the vehicle that defines a sunroof opening into which an associated sunroof panel is received, a first seal member mounted to the sunroof frame for sealing to an underside of a roof of the vehicle and a second seal member slideably mounted to the first seal member for sealing to the associated sunroof panel when the associated sunroof panel is in a closed position.

According to another aspect, a sunroof seal assembly method for a vehicle includes providing a sunroof frame disposed on the vehicle that defines a sunroof opening into which an associated sunroof panel is received when the associated sunroof panel is in a closed position; mounting a first seal member to the sunroof frame for sealing to an underside of a roof of the vehicle; and slideably mounting a second seal member to the first seal member for sealing to the associated sunroof panel when the associated sunroof panel is in the closed position.

According to a further aspect, a seal-on-frame sunroof seal assembly for a vehicle includes a first seal member and a second seal member. The first seal member is mounted to a sunroof frame defining a sunroof opening on the vehicle and the second seal member is slideably mounted to the first seal member. The second seal member is initially mounted at a first high location on the first seal member and is slideably moved in a downward direction into the first seal member as the sunroof frame is secured to a roof of the vehicle and slideably moved to a second low location on the first seal member.

DETAILED DESCRIPTION

Figure 1:
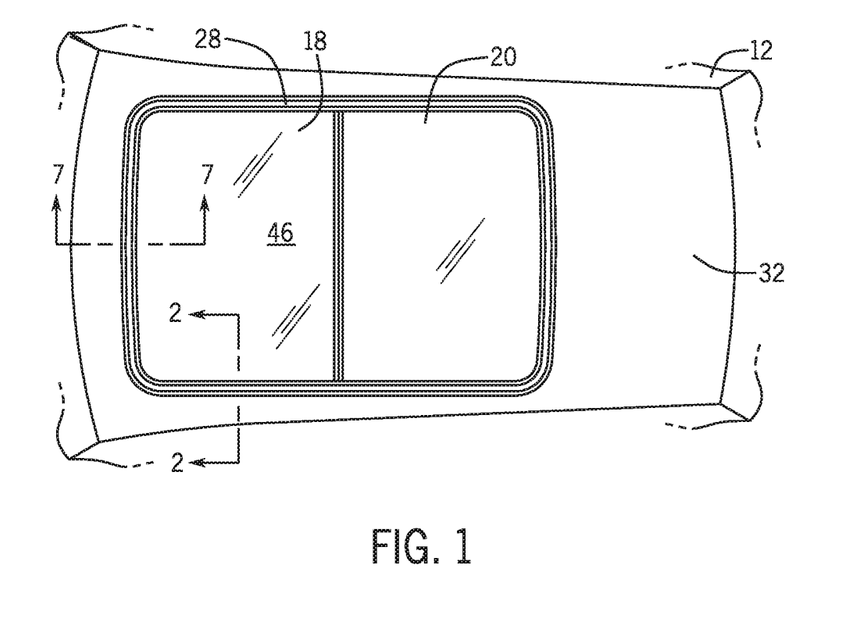
FIG. 1 is a partial plan view of a vehicle showing a sunroof panel or panels mounted or received within a sunroof opening defined in a roof of a vehicle according to an exemplary embodiment.
Figure 2:
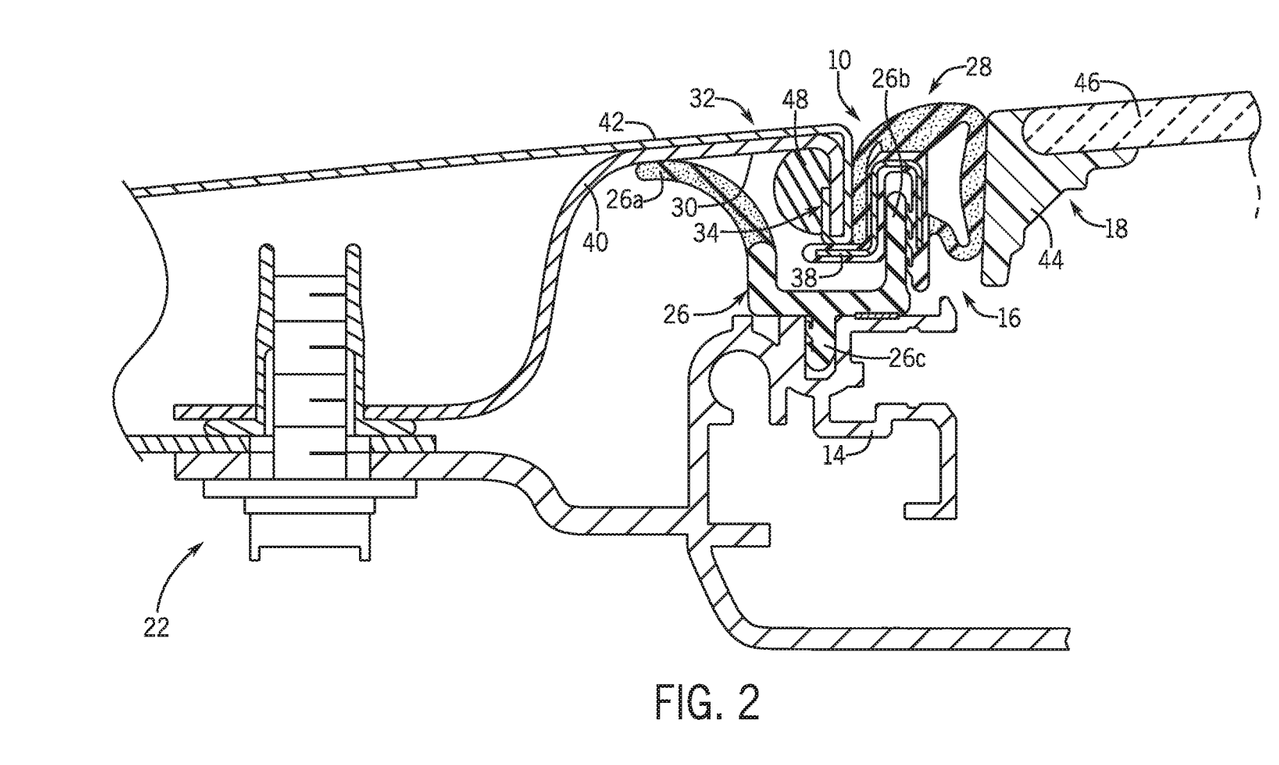
FIG. 2 is a cross-section view taken along the line 2-2 of FIG. 1 showing a sunroof seal assembly having a first seal member mounted to a sunroof frame and a second seal member slideably mounted to the first seal member.

Referring now to the drawings wherein the figures are for purposes of illustrating one or more exemplary embodiments and not for purposes of limiting the same, FIGS. 1 and 2 show a sunroof seal assembly 10 for the vehicle 12 according to an exemplary embodiment. As will be described in more detail below, the sunroof seal assembly 10 includes a sunroof frame or frame member 14 secured to the vehicle 12 that defines a sunroof opening 16 into which an associated sunroof panel 18 is received when the associated sunroof panel 18 is in a closed position. More particularly, in the illustrated embodiment, the sunroof panel 18 is a front sunroof panel forwardly mounted relative to a rear sunroof panel 20 that is also received in the sunroof opening when in a closed position. In one embodiment, only the sunroof panel 18 is a movable sunroof panel; however, in alternate embodiments, both sunroof panels 18, 20 (or only the rear sunroof panel 20) can be moveable sunroof panels that are moveable from the closed positions illustrated in FIG. 1 to respective open positions (not shown).

With specific reference to FIG. 2, the sunroof seal assembly 10 can further include a first seal member 26 and a second seal member 28. As shown, the first seal member 26 can be mounted to the sunroof frame 14 for sealing to an underside 30 of a roof 32 of the vehicle 12. The sunroof frame 14 can be fixedly secured to a roof 32 of the vehicle 12 (e.g., via fasteners 22, only one shown). The second seal member 28 is slideably mounted to the first seal member 26 (i.e., a slip joint is formed between the seal members 26, 28) for sealing to the sunroof panel 18 when the sunroof panel 18 is in the closed position (i.e., the position illustrated in FIGS. 1 and 2) and for sealing to the underside 30 of the roof 32 of the vehicle 12. As will be described in more detail below, the second seal member 28 slides onto and relative to the first seal member 26 when a roof flange 34 of the roof 32 engages the second seal member 28 during assembly of the vehicle 12 (i.e., when the sunroof frame 14 is secured to the roof 32). Since the seal members 26, 28 are secured to the frame 14, which itself is fixedly secured to the vehicle 12 (and not on the moveable sunroof panels 18 or 20), the sunroof seal assembly 10 is a seal-on-frame assembly or construction.

Figure 3:
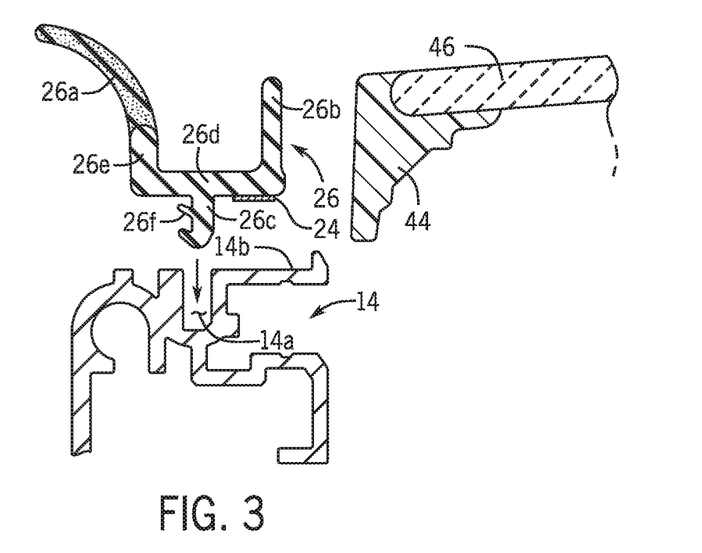
FIG. 3 is a schematic cross-section view showing the first seal member being mounted to the sunroof frame.

With additional reference to FIG. 3, the first seal member 26 includes a sealing portion 26a that seals against the underside 30 of the roof 32 of the vehicle 12 and a slideable mounting portion 26b onto which the second seal member 28 is slideably mounted. The first seal member 26 further includes a frame mounting portion 26c that fixes the first seal member 26 to the sunroof frame 14. Attachment of the first seal member 26 to the sunroof frame 14 can occur after the sunroof frame 14 is secured to the roof 32 of the vehicle. As shown in the illustrated embodiment, the sealing portion 26a can be formed of a first material and the slideable mounting portion 26b and the frame mounting portion 26c can be formed of a second material. The second material can be more rigid than the first material (e.g., the first material for the sealing portion 26a can be less rigid and more flexible) but the first seal member 26, including portions 26a, 26b and 26c, can be formed integrally as a unitary member, as is shown in the illustrated embodiment.

More specifically, in the illustrated embodiment, the slideable mounting portion 26b, which can also be referred to as an upper protruding slideable mounting portion, is formed as an upstanding or protruding flange that is generally oriented orthogonally relative to the roof 32. The sealing portion 26a can also be upstanding so as to be directed toward the underside 30 of the roof 32 but also away from the slideable mounting portion 26b. The first seal member 26 can further include a base portion 26d from which the slidable mounting portion 26b extends upward and from which the frame mounting portion 26c extends downward (i.e., in an opposite direction relative to that in which the slideable mounting portion 26b extends). A seal base portion 26e can extend upward from the base portion 26d in spaced relation relative to, and parallel with, the slideable mounting portion. The seal base portion 26e can be an upstanding flange or protrusion that provides a rigid base structure from which the sealing portion 26a extends (i.e., sealing portion 26a can extend from a distal end of the seal base portion 26e). The frame mounting portion 26c can include one or more barbs 26f to facilitate secure mounting of the first seal member 26 into the sunroof frame 14. In this regard, the sunroof frame 14 can define a groove 14a into which the frame mounting portion 26c of the first seal member 26 is received when mounting and securing the first seal member 26 to the sunroof frame 14. The frame 14 can define an upper surface 14b against which the base portion 26d of the first seal member 26 abuts or rests when the frame mounting portion 26c is inserted fully into the groove 14a of the sunroof frame 14. An adhesive 24 can be interposed between the base portion 26d and the upper surface 14b of the frame 14.

Figure 4:
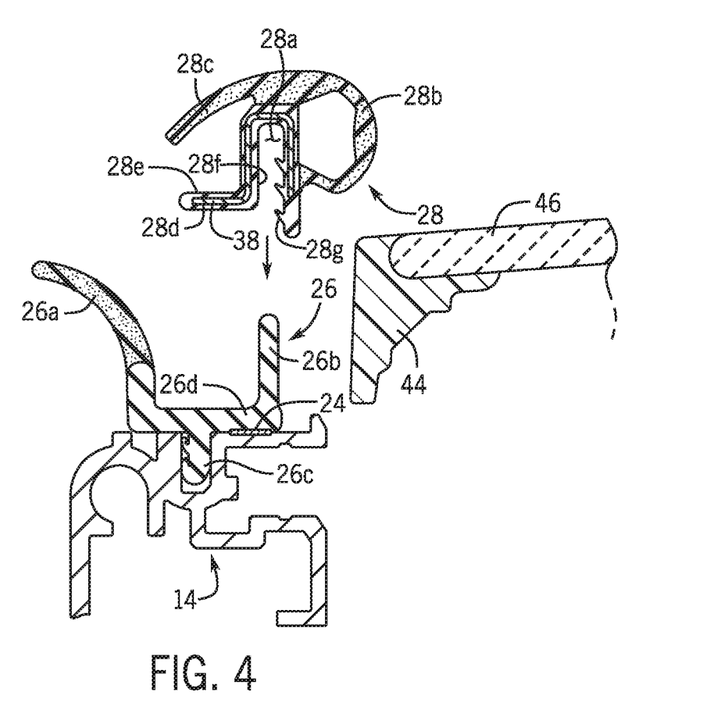
FIG. 4 is a schematic cross-section view showing the second seal member being slideably mounted to the first seal member.

With additional reference to FIG. 4, the second seal member 28 includes a U-shaped mounting channel 28a, which can also be referred to an inverted U-shaped channel, that slideably receives the slideable mounting portion 26b of the first seal member 26 to slideably mount and seat the second seal member 28 onto the first seal member 26. The second seal member 28 further includes a bulbous shaped sunroof sealing portion 28b that seals against the associated sunroof panel 18 when the sunroof panel 18 is in the closed position. The second seal member 28 also includes a flap-like roof sealing portion 28c that seals against roof flange 34 of the roof 32 of the vehicle 12. The roof sealing portion 28c can be disposed on a roof side of the U-shaped mounting channel 28a (i.e., a side facing and/or closer to the roof 32) and the sunroof sealing portion 28b can be disposed on a sunroof side of the U-shaped mounting channel 28a (i.e., a side facing and/or more adjacent the sunroof panel 18) that is opposite the roof side. As shown in the illustrated embodiment, the sunroof sealing portion 28b and the roof sealing portion 28c can be formed of a first material and portions 28c-g can be formed of a second material. The second material can be more rigid than the first material (e.g., the first material can be less rigid and more flexible) but the portions 28a-g can be formed integrally as a unitary member, as is shown in the illustrated embodiment.

Figure 5:
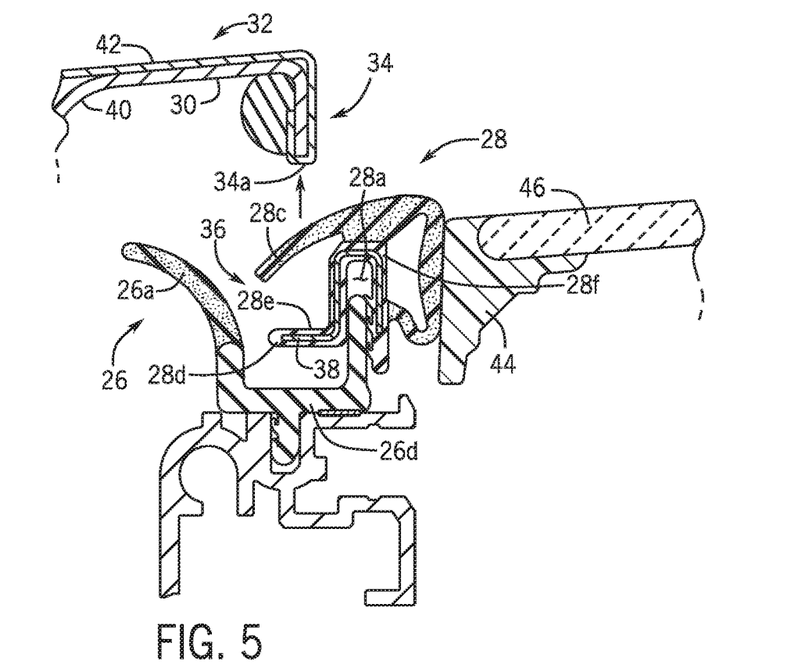
FIG. 5 is a schematic cross-section view schematically showing the sunroof frame being secured to a roof of the vehicle after the second seal member is initially mounted at a first high position.

With further reference to FIG. 5, the second seal member 28 can further include a shelf portion 28d extending from the U-shaped mounting channel 28a toward the roof 32, or more particularly from a main body portion 28f of the second seal member 28 that defines the U-shaped channel 28a. The shelf portion 28d has or defines an upper contact surface 28e provided for engagement or abutment with a distal end 34a of the roof flange 34. In particular, the abutment by the distal end 34a of the roof flange 34 with the upper contact surface 28e of the shelf portion 28d of the second seal member 28 slideably moves the second seal member 28 relative to the first seal member 26 such that the U-shaped mounting channel 28a of the second seal member 28 further seats onto the slideable mounting portion 26b of the first seal member 26.

As shown in FIG. 5, the first and second seal members 26, 28 define a flange recess 36 into which the roof flange 34 of the roof 32 is received. Generally, the flange recess 36 is defined between the sealing portion 26a (and the base portion 26d) and the slideable mounting portion 26b. The flange recess 36 is also defined between the sealing portion 26a and the U-shaped channel 28a. The second seal member 28 further includes the main body portion 28f that specifically defines the U-shaped mounting channel 28a and provides a body to which the other portions 28b, 28c and 28d are mounted. Barbs 28g can extend inward from the main body portion 28f into the U-shaped mounting channel 28a for more securely mounting the second seal member 28 to the first seal member 26 and inhibiting removal or pulling away of the second seal member 28 relative to the first seal member 26. As shown, the sunroof sealing portion 28b can be formed as a bulbous sunroof sealing portion extending in a first direction away from the flange recess 36 and toward the sunroof panel 18 when the sunroof panel 18 is in the closed position to seal against the sunroof panel 18. The roof sealing portion 28c can be referred to as a flap-like roof sealing portion and, as shown, extends in a second, opposite direction away from the flange recess 36 toward the roof 32 of the vehicle 12 to seal against the roof flange 34 of the roof 32.

A seal stiffener 38 can be embedded in the second seal member 28 at least at the location of the shelf portion 28d. In the illustrated embodiment, the stiffener 38 is embedded in the main body portion 28f and in the shelf portion 28d. As shown, the seal stiffener 38 can be formed generally complementarily relative to the U-shaped mounting channel 28a and the shelf portion 28d (i.e., the seal stiffener 38 can have the same general shape as the portions in which it is embedded). Thus, the seal stiffener 38 extends around the U-shaped mounting channel 28a and along the shelf portion 28d, or at least a portion thereof). In one embodiment, the seal stiffener 38 is formed of a relatively rigid material, such as a metal (e.g., aluminum or stainless steel). The second seal member 28, in contrast, can be formed with a relatively less rigid material, such as rubber or the like. In one embodiment, the second seal member 28 is formed integrally as a unitary member but can be formed of a first material for portions 28a-b and a second material for portions 28c-g as described hereinabove.

As shown, the roof 32 can include or be formed of a roof stiffener 40 and a roof skin 42. A dust sealer 48 can be applied at the location of the roof flange 34. In the illustrated embodiment, the roof skin 42 wraps around the roof stiffener 40 at the location of the distal end 34a of the roof flange 34 to form the roof flange 34 as a hem flange, though this is not required. The roof stiffener 40 and the roof skin 42 can be formed of steel or aluminum, or some other material, as is known an understood by those skilled in the art. As shown and already described, the sunroof frame 14 can be secured to the roof 32. In particular, the sunroof frame 14 can be secured to the roof stiffener 40 as shown via fasteners 22 (only one shown). It is during installation of the sunroof frame 14 to the roof 32 (i.e., when the sunroof frame 14 is moved into position and fixed to the roof 32) that engagement between the roof flange 34 and the shelf portion 28d of the second seal member 28 can occur and cause the second seal member 28 to further seat onto the first seal member 26.

The sunroof panel 18 can include or be formed of a sunroof transparent panel member 46 (e.g., glass) and an encapsulation resin or plastic 44 surrounding the panel member 46. Also, seal brackets (not shown) can be provided around a periphery of the panel member 46.

Figure 6:
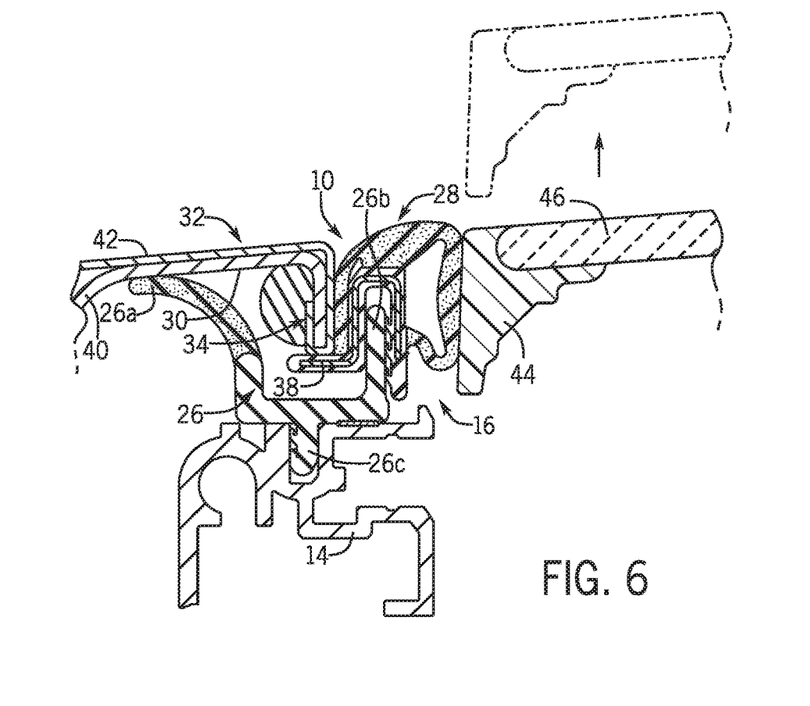
FIG. 6 is a cross-section view similar to FIG. 2 but schematically showing the sunroof panel movable from the closed position to an open position.
Figure 7:
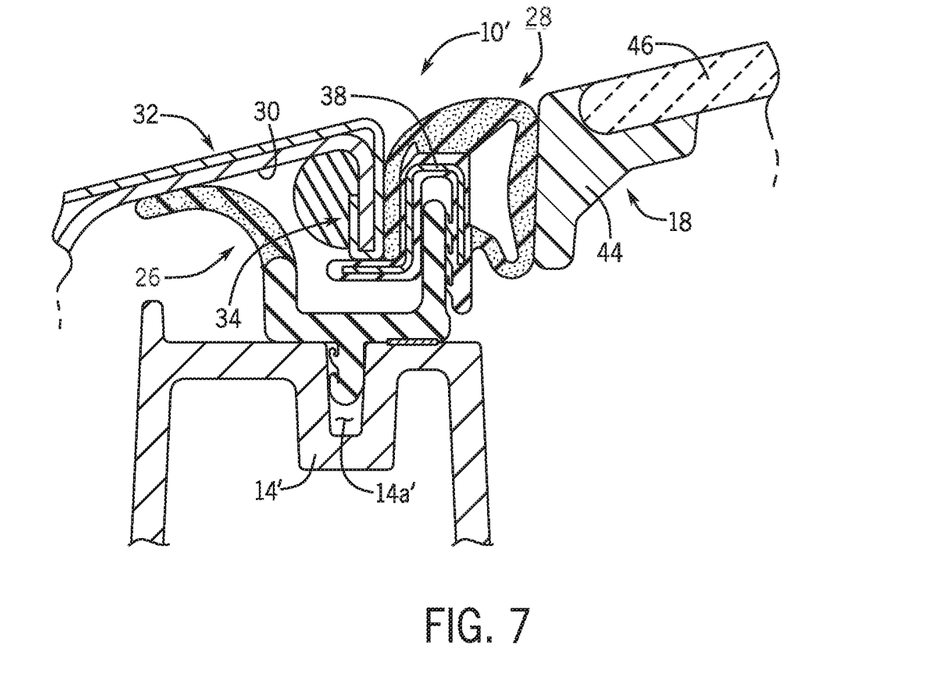
FIG. 7 is a cross-section view taken along the line 7-7 of FIG. 1.

With reference to FIG. 7, a cross-section of a sunroof seal assembly 10' is shown taken along a forward end of the vehicle 12. The assembly 10' can be the same or similar to the sunroof assembly 10 except as indicated herein. The sunroof frame 14 can be replaced with a forward sunroof frame or frame member 14'. Thus, the frame member 14' can be a different frame member than frame 14 but these can be secured together to form the entire sunroof frame around the sunroof opening 16. The seal members 26, 28 can be the same seal members as shown in FIGS. 2-6 (i.e., the seal members of FIG. 7 can be integrally formed so as to extend around from the cross-section location shown in FIG. 2 to the cross-section location shown in FIG. 7). Alternatively, separate seal members can be provided along each side of the sunroof opening 16 but having similar constructions and profiles. As shown, the vehicle roof 32 can have a more curved shaped near the sunroof seal assembly 10' and likewise the sunroof panel 18 can have a more curved shape near the sunroof seal assembly 10' (e.g., as compared to the shape of the roof 32 and the sunroof panel 18 near the sunroof seal assembly 10).

Figure 8:
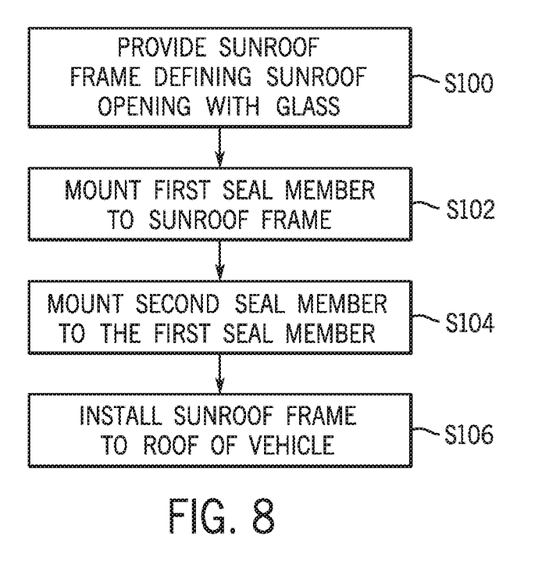
FIG. 8 is a process flow diagram showing a sunroof seal assembly method according to an exemplary embodiment.

With reference now to FIG. 8, a sunroof seal assembly method for a vehicle will be described according to an exemplary embodiment. In particular, the method of FIG. 8 will be described in association with the sunroof seal assembly 10 described hereinabove though it is to be appreciated and understood that the method could be used with other sunroof seal assemblies. As shown in FIG. 8, the method includes, at S100, providing a sunroof frame 14 that defines a sunroof opening 16 into which the associated sunroof panel 18 is received when the sunroof panel 18 is in a closed position. This can be the sunroof frame 14 shown in FIGS. 2-6. S100 can include providing the sunroof frame 14 with the sunroof panel 18 (i.e., having sunroof glass 46).

At S102, the first seal member 26 is mounted to the sunroof frame 14 for sealing to the underside 30 of the roof 32 of the vehicle 12. This is shown schematically in FIG. 3. In particular, the first seal member 26 is secured to the frame 14 via the frame mounting portion 26c being inserted into the groove 14a. Next, at S104, the second seal member 28 is slideably mounted to the first seal member 26 for sealing to the sunroof panel 18 when the sunroof panel 18 is in the closed position. This is shown schematically in FIG. 4. In particular, the second seal member 28 is seated at a first high location via the U-shaped mounting channel 28a partially receiving the slideable mounting portion 26b. With further reference also to FIG. 5, the second seal member 28 is initially mounted at the first high location (the location shown in FIG. 5) on the first seal member 26. In the first high location, the second seal member 28 is spaced apart from the sunroof frame 14, and particularly from the upper surface 14b thereof, a first distance.

Next, as shown at S106, the sunroof frame 14 is installed to the roof 32 of the vehicle 12. In particular, the sunroof frame 14 is secured to the roof stiffener 40 via fasteners 22. During this installation, the roof flange 34 is received into the flange recess 36, which is schematically shown in FIG. 5. As sunroof frame 14 is fully installed, the roof flange 34 engages the second seal member 28, particularly the roof flange 34 engages the shelf portion 28d of the second seal member 28, and moves the second seal member 28 relative to the first seal member 26. This causes the second seal member 28 to slideably seat onto the first seal member 26 via the roof flange 34 of the roof 32 engaging and forcibly moving the second seal member 28. The second seal member 28 includes the shelf portion 28d into which the roof flange 34 engages to move the second seal member 28 onto and relative to the first seal member 26. In particular, the second seal member 28 is slideably moved in a downward direction into the first seal member 26 as the sunroof frame 14 is secured to the roof 32 to a second low location on the first seal member 26 (i.e., the second low location is shown in FIG. 6). This avoids or at least significantly reduces any tolerances associated with conventional seal-on-frame seal arrangements because the second seal member 28 is moved into a desired position relative to the roof 32.

Figure 9:
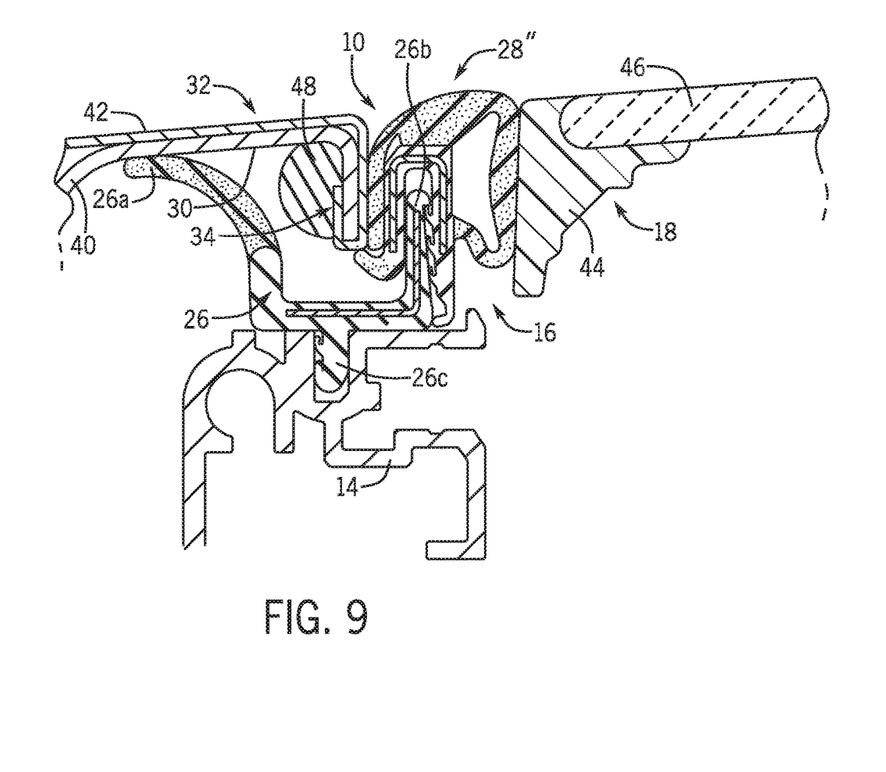
FIG. 9 is a cross-section view similar to FIG. 2 but showing a sunroof seal assembly according to an alternate exemplary embodiment.

With reference to FIG. 9, a cross-section of sunroof seal assembly 10" is shown according to an alternate exemplary embodiment. The sunroof seal assembly 10" is the same or similar to the sunroof seal assembly 10 except as indicated herein. The main difference between the sunroof seal assembly 10" and the sunroof seal assembly 10 is that the second seal member 28 is replaced by second seal member 28"'. The second seal member 28" is similar to the second seal member 28 but does not include a shelf portion 28d. This enables the second seal member 28" to be installed onto the first seal member 26 even after the sunroof frame 14 is secured to the roof 32. This is because the shelf portion 28d is absent and does not interfere with sliding the second seal member 28" onto the first seal member even after the sunroof frame 14 is secured to the roof 32 and the roof flange 34 is already received in the flange recess 36.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A sunroof seal assembly for a vehicle, comprising:
a sunroof frame disposed on the vehicle that defines a sunroof opening into which an associated sunroof panel is received;
a first seal member mounted to the sunroof frame for sealing to an underside of a roof of the vehicle; and
a second seal member slideably mounted to the first seal member for sealing to the associated sunroof panel when the associated sunroof panel is in a closed position
wherein the second seal member slides onto and relative to the first seal member when a roof flange of the roof of the vehicle engages the second seal member and moves the second seal member relative to the first seal member during installation of the sunroof frame to the roof of the vehicle,
wherein the first seal member includes:
a sealing portion that seals against the underside of the roof of the vehicle, a slideable mounting portion onto which the second seal member is slideable mounted, a base portion from which the slideable mounting portion extends upward, and a seal base portion from which the sealing portion extends upward, the seal base portion extends upward from the base portion in spaced relation relative to, and parallel with, the slideable mounting portion.

2. The sunroof seal assembly of claim 1, wherein the first seal member further includes:

a frame mounting portion that fixes the first seal member to the sunroof frame.

3. The sunroof seal assembly of claim 1, wherein the sealing portion is formed of a first material and the slideable mounting portion is formed of a second material, wherein the second material is more rigid than the first material, and wherein the first seal member is formed integrally as a unitary member.

4. The sunroof seal assembly of claim 1, wherein the second seal member includes:

a U-shaped mounting channel that slideably receives the slideable mounting portion of the first seal member to slideably mount the second seal member onto the first seal member; and a sunroof sealing portion that seals against the associated sunroof panel when the associated sunroof panel is in the closed position.

5. The sunroof seal assembly of claim 4, wherein the second seal member further includes:

a flap-like roof sealing portion having a distal free end that extends away from the U-shaped mounting channel, the roof sealing portion seals against the roof flange of the roof of the vehicle, wherein the roof sealing portion is disposed on a roof side of the U-shaped mounting channel and the sunroof sealing portion is disposed on a sunroof side of the U-shaped mounting channel that is opposite the roof side.

6. The sunroof seal assembly of claim 5, wherein the second seal member includes a shelf portion extending from the U-shaped mounting channel toward the roof, the shelf portion having an upper contact surface in abutment with a distal end of the roof flange, wherein said abutment by the distal end of the roof flange of the roof with the upper contact surface of the shelf portion of the second seal member slideably moves the second seal member relative to the first seal member such that the U-shaped mounting channel of the second seal member further seats onto the slideable mounting portion of the first seal member.

7. The sunroof seal assembly of claim 1, wherein the first and second seal members define a flange recess into which the roof flange of the roof is received, the second seal member having a shelf portion with a contact surface that is engaged by the roof flange to move the second seal member slideably relative to the first seal member and further seat the second seal member relative to the first seal member.

8. The sunroof seal assembly of claim 7, wherein the second seal member includes a bulbous sunroof sealing portion extending in a first direction away from the flange recess and toward the associated sunroof panel when the associated sunroof panel is in the closed position to seal against the associated sunroof panel and further includes a flap-like roof sealing portion extending in a second, opposite direction away from the flange recess toward the roof of the vehicle to seal against the roof flange of the roof.

9. The sunroof seal assembly of claim 7, wherein a seal stiffener is embedded in the second seal member at the location of the shelf portion.

10. The sunroof seal assembly of claim 9, wherein the seal stiffener extends around a U-shaped mounting channel of the second seal member that receives a slideable mounting portion of the first seal member.

11. The sunroof seal assembly of claim 7, wherein the roof includes a roof stiffener and a roof skin, the roof skin wraps around the roof stiffener at the location of the distal end of the roof flange to form a hem.

12. A sunroof seal assembly method for a vehicle, comprising:

providing a sunroof frame disposed on the vehicle that defines a sunroof opening into which an associated sunroof panel is received when the associated sunroof panel is in a closed position;

mounting a first seal member to the sunroof frame for sealing to an underside of a roof of the vehicle; and slideably mounting a second seal member to the first seal member for sealing to the associated sunroof panel when the associated sunroof panel is in the closed position installing the sunroof frame to the roof of the vehicle by inserting a roof flange of the roof into a flange recess adapted to receive the roof flange, wherein the roof flange engages the second seal member and moves the second seal member relative to the first seal member, wherein the first seal member includes a slideable mounting portion and a sealing portion that seals against the underside of the roof of the vehicle, wherein the second seal member includes a U-shaped mounting channel that slideably receives the slideable mounting portion of the first seal member and a flap-like roof sealing portion having a distal free end, wherein the engagement of the roof flange with the second seal member moves the flap-like roof sealing portion into sealingly engagement with the U-shaped mounting channel.

13. The sunroof seal assembly method of claim 12, further including:

slideably seating the second seal member onto the first seal member via the roof flange of the roof engaging and forcibly moving the second seal member.

14. The sunroof seal assembly of claim 13, wherein the second seal member includes a shelf portion into which the roof flange engages to move the second seal member onto and relative to the first seal member.

15. The assembly of claim 11, further comprising a dust sealer applied at the location of the roof flange and contacts a bottom surface of the roof stiffener.

16. The assembly of claim 12, further comprising applying a dust sealer at the location of the roof flange and contacts a bottom surface of a roof stiffener.

* * * * *